United States Patent [19]

Underwood

[11] Patent Number: 4,569,817
[45] Date of Patent: Feb. 11, 1986

[54] MINIATURE FISSION CHAMBER AND SIGNAL CABLE ASSEMBLY

[75] Inventor: Richard H. Underwood, Elmira, N.Y.

[73] Assignee: Westinghouse Electric Corp., Pittsburgh, Pa.

[21] Appl. No.: 495,550

[22] Filed: May 17, 1983

[51] Int. Cl.$^4$ .................................................. G21C 17/00
[52] U.S. Cl. .................................... 376/154; 376/203; 376/254
[58] Field of Search ............... 376/203, 254, 255, 154; 250/390–392; 174/19

[56] References Cited

U.S. PATENT DOCUMENTS

| | | | |
|---|---|---|---|
| 2,809,313 | 10/1957 | Baer et al. | 376/154 |
| 3,028,328 | 4/1962 | Tengsater | 376/203 |
| 3,043,954 | 7/1962 | Boyd et al. | 376/154 |
| 3,769,156 | 10/1973 | Brecy | 376/255 |
| 4,012,282 | 3/1977 | Hutter et al. | 376/203 |
| 4,137,423 | 1/1979 | Cannon et al. | 179/19 |
| 4,139,724 | 2/1979 | Meiss et al. | 179/19 |
| 4,142,937 | 3/1979 | Eyral et al. | 376/203 |
| 4,379,118 | 4/1983 | Roche | 250/390 |
| 4,393,307 | 7/1983 | Nozaki et al. | 250/390 |
| 4,420,456 | 12/1983 | Nickel et al. | 376/203 |

Primary Examiner—Sal Cangialosi
Attorney, Agent, or Firm—W. G. Sutcliff

[57] ABSTRACT

A fission chamber assembly for use in-core of a nuclear reactor with the fission chamber included within a small diameter tubular housing which is hermetically sealed at opposed ends. A signal cable end seal assembly is provided at one end of the tubular housing serving to hermetically seal the mineral insulated coaxial signal cable to the tubular housing. A second cable end seal assembly is included within the tubular housing between the signal cable end seal assembly and the fission chamber, with a hermetically sealed gas-filled reservoir defined between the spaced-apart cable end seal assemblies. These redundant seal assemblies provide an improved reliability detector for use in the reactor hostile environment.

7 Claims, 2 Drawing Figures

MINIATURE FISSION CHAMBER AND SIGNAL CABLE ASSEMBLY

BACKGROUND OF THE INVENTION

The present invention relates to fission chamber radiation detectors, and more particularly to miniature small diameter detectors which are intended for in-core nuclear reactor use.

Such fission chambers are well known in the art, and in general a small amount of fissionable material is disposed within a gas-filled hermetically sealed chamber, with spaced-apart electrodes sensing current flowing through the gas as a function of incident radiation, as from a nuclear reactor core. The detector is typically electrically connected to a mineral insulated coaxial signal cable which brings the sensed signal current to remotely disposed electronic monitoring circuitry.

Since the detector is intended for in-core use it must reliably withstand this hostile environment. The sensitivity of the detector should be constant and the detector reliable in the high temperature hostile in-core environment. The most common source of detector failure is the failure of the ceramic to metal seal at the detector chamber to cable termination or end seal. It is desirable to provide a reliable cable end seal for such detector chambers.

A variety of prior art cable end seal structures utilize a ceramic end seal assembly to make a hermetic seal to mineral insulated signal cable, as seen in U.S. Pat. Nos. 4,139,724 and 4,137,423.

SUMMARY OF THE INVENTION

A fission chamber assembly for use in-core of a nuclear reactor comprising a tubular housing member hermetically sealed at opposed ends. A signal cable end seal assembly is provided at one end of the tubular housing and hermetically sealed to a metal walled mineral insulated signal cable. A tubular fission chamber electrode is disposed coaxially within the tubular housing member, with electrical signal wire extending from the electrode and hermetically sealed through the signal cable end seal assembly.

The signal cable end seal assembly comprises a primary signal cable end seal assembly and a redundant signal cable end seal assembly which are spaced apart within the tubular housing. The primary signal cable end seal assembly seals one end of the fission chamber, and the redundant signal cable end seal assembly is sealed to the signal cable.

A hermetically sealed gas-filled reservoir is defined between the primary and redundant signal cable and seal assemblies.

DESCRIPTION OF THE PREFERRED EMBODIMENT

Figure 1:
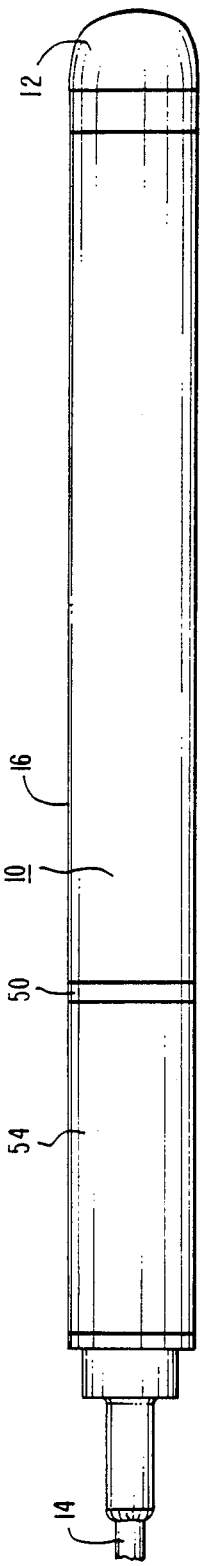
FIG. 1 is a side elevational view showing the fission chamber of the present invention with a domed tip shield at one end and a signal cable extending from the other end.
Figure 2:
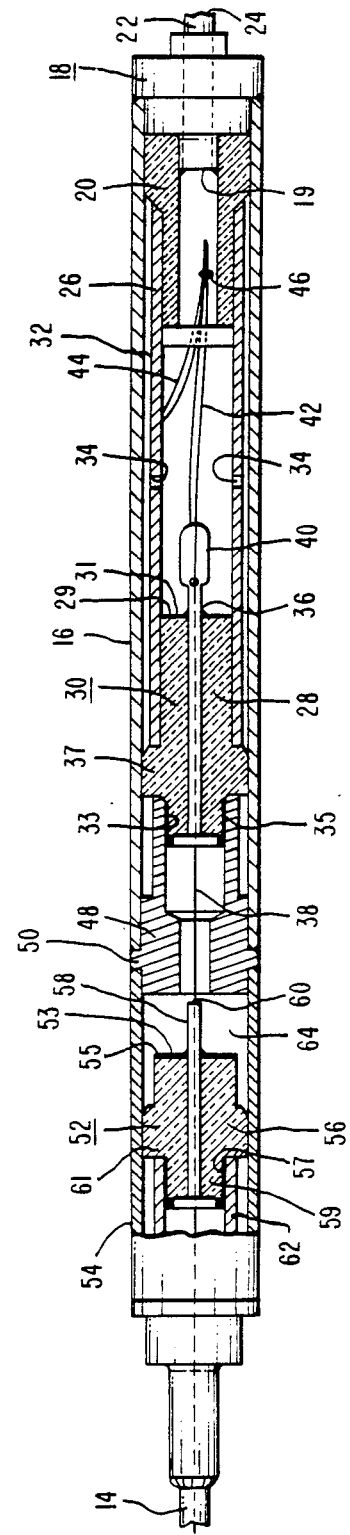
FIG. 2 is a view of the assembly of FIG. 1 partly in section and prior to mounting the tip shield in place.

The invention can be best understood by reference to the embodiment seen in FIGS. 1 and 2, wherein the in-core fission chamber assembly 10 includes a domed tip shield 12 at one end, and a coaxial signal cable 14 sealed at the other end. The fission chamber assembly 10 is an elongated small diameter assembly, by way of example, about 0.188 inch outside diameter. The metal outer sheath of coaxial signal cable 14 is heliarc welded to the end seal assembly 52 to provide a hermetic connection between the cable and the fission chamber detector. This hermetic seal is formed by welding the sheath of cable 14 to the tubular member 62.

The fission chamber assembly 10 is seen in cross-sectional detail in FIG. 2. The assembly 10 includes an outer tubular housing member 16 which is hermetically sealed at one end to exhaust tube bottom cap assembly 18. The exhaust tubulation 22 extends through the bottom cap assembly 18 and is welded to the bottom cap assembly 18 at the inward terminating end 19 of assembly 18. The terminating end 24 of tubulation 22 is hermetically tipped off as one of the final assembly steps as will be explained below. The tip shield 12 is welded in place thereafter to protect the tipped off tubulation terminating end 24.

A tubular fission chamber electrode 26 is disposed coaxially within and is closely spaced from the outer tubular housing member 16. This tubular electrode 26 is supported at one end by tubular ceramic support member 20 which fits within electrode 26, and supported at the other end by a cylindrical ceramic member 28 which is a part of the primary signal cable end seal assembly 30. The tubular electrode 26 is very accurately spaced from the outer tubular housing member to define an annular fission chamber 32 therebetween. A predetermined amount of fissionable material, such as uranium-235, is plated on the outer surface of tubular electrode 26 which is typically a stainless steel material. The spacing between the electrode 26 and housing 16 is about 0.009 inch, and this annular fission chamber volume is filled with selected gas such as argon at about 900 Torr fill pressure. Apertures 34 are provided through tubular electrode 26 to permit exhaust and gas filling of the annular fission chamber 32.

The primary signal cable end seal assembly 30 includes the cylindrical ceramic member 28 which has a bore along its central longitudinal axis and a tubular member 36 fitted within the bore. A metallized layer 29 is disposed on the end face 31 of ceramic member 28, and the tubulation 36 is brazed to this metallized layer 29 to form a hermetic seal. A metallized layer 33 is disposed on perimeter surface of reduced diameter end 35 of ceramic member 28, and member 48 is brazed to this metallized layer 33. The enlarged diameter portion 37 of ceramic member 28 is closely fitted within tubular housing 16. A stainless steel extension wire 38 from the center wire of the signal cable 14 extends within tubular member 36 and is hermetically sealed as well as electrically connected to tipped off end 40 of tubular member 36. A plurality of signal extension wires 42 are electrically connected by tack welding to this tipped off end 40, which extension wires extend along the longitudinal axis within the space defined by the tubular electrode 26. A plurality of signal wires 44 are tack welded to the inside surface of the tubular electrode 26, and signal wires 44 and signal extension wires 42 are electrically connected at junction 46 located within the bore of tubular ceramic support 20.

The primary signal cable end seal assembly 30 also includes a generally tubular metal member 48 extending from the end of the cylindrical ceramic member 28 opposed to the end which supports the tubular electrode. This member 48 includes an enlarged diameter portion 50 which is of the same diameter as the tubular housing 16 and is hermetically sealed thereto as by heliarc welding. The signal cable extension wire 38 extends through and is spaced from member 48 and is continued through redundant signal cable end seal assembly 52.

The redundant signal cable end seal assembly 52 has the same essential structure as the primary signal cable end seal assembly 30, and is disposed within tubular housing extension 54 of the same diameter as tubular housing member 16. The tubular housing extension 54 and housing member 16 are each hermetically sealed to the enlarged diameter portion 50 of the member 48 associated with the primary cable end seal assembly. This sealing is by welding, followed by a finishing operation which insures that this weld area has a uniform outside diameter which is the same as that of the tubular housing 50.

The redundant signal cable end seal assembly 52 includes a generally cylindrical ceramic member 56 having a central bore along its longitudinal axis. A tubular member 58 is disposed within the bore of ceramic member 56, with the cable signal extension wire 38 passing through tubular member 58 and hermetically sealed through tipped off end 60 of tubular member 58. A metallized layer 53 is disposed on the end face 55 of ceramic member 56, and the tubulation 58 is brazed to this metallized layer 53 to form a hermetic seal. A metallized layer 57 is disposed on the perimeter surface of reduced diameter end 59 of ceramic member 56, and member 62 is brazed to metallized layer 57. The enlarged diameter portion 61 of ceramic member 56 is closely fitted with tubular housing 54. A generally tubular metal member 62 extends from ceramic member 56 toward and is sealed to the outer sheath of cable 14. A gas-filled reservoir 64 is established between the redundant end seal assembly 52 and the primary end seal assembly 30. This gas-filled reservoir 64 has the same fill gas of argon at 900 Torr as for the fission chamber.

Since most field failures of such fission chamber radiation detectors occur at the signal cable end seal area of the fission chamber, the redundant design of the present invention provides an enhanced reliability detector.

If the seal at the cable redundant end seal assembly fails, there is no effect on the fission chamber operation because the primary end seal assembly maintains chamber integrity. Should the inner or primary end seal fail, the redundant seal assembly and the reservoir between the redundant seal and the primary seal again insure the detector will function without loss of sensitivity.

The double end sealed fission chamber radiation detector of the present invention is fabricated by first sealing the cable 14 to the redundant end seal assembly 52 providing a hermetic seal between the tubular outer conductor of the signal cable 14 and the tubular member 62 of the end seal assembly 52. The signal cable center wire extension 38 extends through tubulation 58 and is hermetically sealed through the tipped off end 60 of tubulation 58. Tubular housing extension 54 is sealed in place about the end seal assembly 52.

The fission chamber is formed by plating a limited area of the outside surface of tubular electrode 26 with a fissionable material such as uranium 235 or 238. The plated electrode is mounted on or supported by the ceramic member 28 of the primary cable end seal assembly 30. The extension wires 42 are then electrically connected from the tubulation tip-off 40 and the electrode 26 to each other with the bore of the ceramic member 20.

The primary cable end seal assembly 30 is then sealed to the redundant cable end seal assembly while exhausting the reservoir chamber 64 through tubulation 36 and back filling with the argon fill gas. The enlarged diameter portion 50 is welded to the end of tubular extension 54, and then tubulation 36 is hermetically tipped off at the end portion 40, with electrical continuity being maintained between signal cable center wire 38 and the wires 42.

The tubular housing 16 and end assembly 18 are then fitted in place, and the fission chamber is exhausted and back filled with argon through tubulation 22 while hermetically sealing the housing 16 to the enlarged diameter portion 50 of the primary end seal assembly 30, and sealing the end assembly 18 to the other end of the housing 16. Tubulation 22 is thereafter heremetically tipped off at end 24, and domed tip shield member 12 is tack welded to the housing 16 to complete the assembly. This domed tip shield facilitates insertion of the fission chamber into the reactor core or a sensing tubulation.

I claim:

1. A fission chamber assembly for use in-core of a nuclear reactor comprising:
   (a) a tubular housing member which is hermetically sealed at opposed ends, one end of which has an exhaust tube bottom cap assembly, and the opposed end of which has a signal cable end seal assembly;
   (b) a tubular fission chamber electrode disposed coaxially within the tubular housing member, with electrical signal wire extending from the electrode and hermetically sealed through the signal cable end seal assembly, and wherein
   (c) the signal cable end seal assembly comprises
      (i) a primary signal cable end seal assembly comprising a generally cylindrical insulating member having a central aperture through which the extension signal wire is hermetically sealed, which insulating member has a first reduced diameter end fitting within and supporting the tubular fission chamber electrode, and a second end sealed to the tubular housing member, and
      (ii) a redundant signal cable end seal assembly comprising a generally cylindrical insulating member having a central aperture through which the signal wire is hermetically sealed, which insulating member is fitted within and hermetically sealed to a tubular housing extension member and to the signal cable, and wherein the tubular housing extension member is aligned with and sealed to one end of the tubular housing member.

2. The fission chamber assembly set forth in claim 1, wherein the primary and redundant signal cable end seal assemblies insulating member includes an enlarged diameter portion which is slidably fitted within the tubular housing member.

3. The fission chamber assembly set forth in claim 1, wherein the primary signal cable end seal assembly second end which is sealed to the tubular housing member comprises a generally tubular conductive member which is supported from a second reduced diameter portion of the insulating member coaxial about the assembly longitudinal axis, and wherein the generally tubular conductive member includes an enlarged diameter portion which is sealed to the tubular housing member.

4. The fission chamber assembly set forth in claim 1, wherein the redundant signal cable end seal assembly includes a generally tubular conductive member supported from a reduced diameter portion of the redundant seal assembly insulating member coaxial about the assembly longitudinal axis, and wherein the generally tubular conductive member includes an enlarged diameter portion which is sealed to the tubular housing extension member.

5. The fission chamber assembly set forth in claim 1, wherein the tubular fission chamber electrode is closely coaxially spaced from the tubular housing member with an annular gas-filled fission chamber defined therebetween, with a selected fissionable material provided on the outer wall surface of the tubular fission chamber electrode producing fission products in the annular fission chamber.

6. The fission chamber assembly set forth in claim 1, wherein the tubular fission chamber electrode has an aperture through the tubular fission chamber electrode and wherein the volume defined by the tubular fission chamber electrode and opposed sealed ends is filled with the same desired fill gas and pressure as the annular fission chamber with the aperture providing communication therebetween.

7. The fission chamber assembly set forth in claim 1, wherein signal cable center wire extension wires extend from the primary signal cable end seal assembly generally along the longitudinal axis of the tubular fission chamber electrode, and are electrically connected to electrode lead wires extending from the interior surface of the tubular fission chamber electrode.

* * * * *